United States Patent

[11] 3,577,890

| [72] | Inventors | Edgar F. Walker;<br>Montez A. Walker, Greenville, S.C. |
|---|---|---|
| [21] | Appl. No. | 32,216 |
| [22] | Filed | Apr. 27, 1970 |
| [45] | Patented | May 11, 1971 |

[54] MUSICAL TEACHING AID
4 Claims, 4 Drawing Figs.

[52] U.S. Cl. .................................................. 84/472,
84/482
[51] Int. Cl. ..................................................... G09b 15/02
[50] Field of Search .......................................... 84/470-
—473, 477, 478, 482, 483, 485

[56] References Cited
UNITED STATES PATENTS
1,527,824  2/1925  Armstrong .................. 84/471

1,741,769  12/1929  Hall ............................ 84/478
1,833,204  11/1931  Buxton ....................... 84/478

Primary Examiner—Richard B. Wilkinson
Assistant Examiner—John F. Gonzales
Attorney—Bailey & Dority

ABSTRACT: An apparatus for teaching the relationship between musical notes on a staff and the keyboard of a piano. The apparatus includes five spaced parallel elongated rods which are supported so that one end of the rods and the spaces therebetween terminate in corresponding keys on a keyboard. A display element having an elliptically shaped main body and a shank portion positioned on said rods. A transverse bore extends through the main body perpendicular to an elongated slot for accommodating the shank portion so that more than one main body portion can be positioned on the shank in order to represent the interval between notes.

Patented May 11, 1971
3,577,890
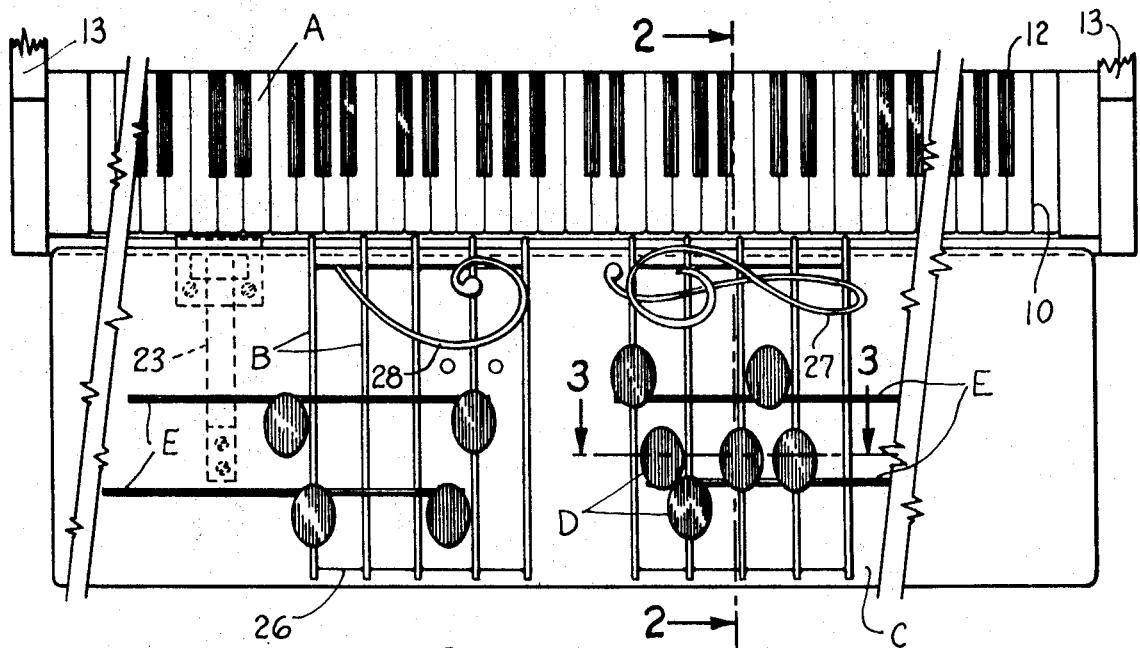
Fig. 1.
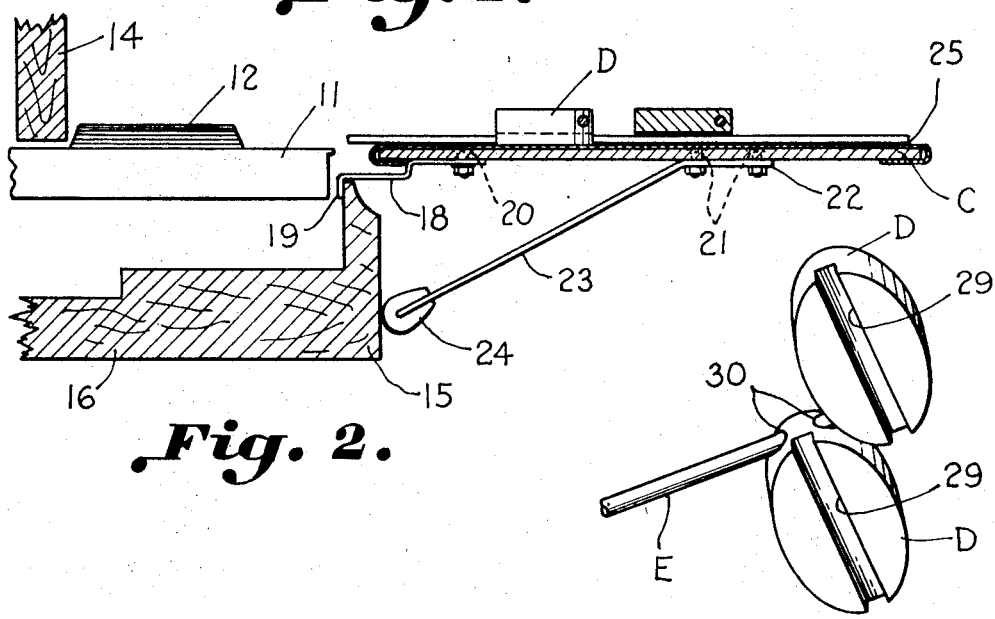
Fig. 2.
Fig. 4.
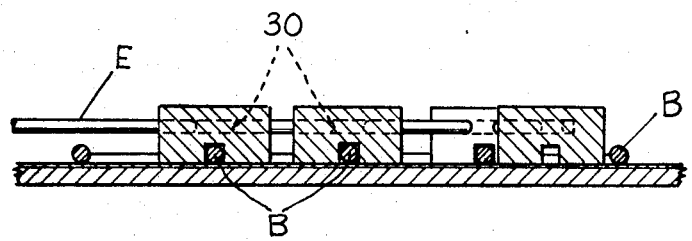
Fig. 3.
INVENTORS.
EDGAR F. WALKER
BY & MONTEZ A. WALKER
Bailey & Doulty
ATTORNEYS.

MUSICAL TEACHING AID

This invention relates to an educational device, and more particularly to an apparatus for teaching the relationship between musical notes and the keyboard of a piano.

One problem encountered by beginners learning music is that they will frequently have difficulty grasping the relationship between printed music and a keyboard. One reason for this is that the musical grand staff has an entirely different appearance from the keys of a keyboard.

Several attempts have been made to simplify the task of teaching music by the use of instruments, such as illustrated in U.S. Pat. Nos. 1,768,706, 2,082,432, 2,742,810, 1,747,350 and many others, but for one reason or another such have not been readily adopted by parents and teachers of music. One reason for such is that from reviewing the patents, it appears they would be fragile and subject to breaking easily from frequent handling.

Another possible reason is the cost in manufacturing the apparatus in accordance with the peculiar features possessed thereby.

Accordingly, it is an important object of the present invention to provide an improved apparatus for teaching the relationship between musical notes and the keyboard of a piano.

Another important object of the present invention is to provide an instrument for aiding in teaching music which is very simple and inexpensive to manufacture.

Another very important object of the present invention is to provide an apparatus for teaching music reading in which the intervals between notes can be readily ascertained and demonstrated.

A further important object of the present invention is to provide an apparatus which can be mounted on a piano so that the notes on a musical grand staff can be related directly to the keyboard of a piano.

Still another object of the present invention is to provide an apparatus which can be used by parents and inexperienced persons for aiding beginners in learning to read music in the home.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a plan view illustrating the keyboard of a piano and an apparatus for teaching note reading constructed in accordance with the present invention, FIG. 2 is a transverse sectional view taken along line 2–2 in FIG. 1, FIG. 3 is a sectional view taken along line 3–3 of FIG 1, and FIG. 4 is an enlarged perspective view illustrating the bottom side of one of the display elements constructed in accordance with the present invention.

The drawing illustrates an apparatus for teaching the relationship between musical notes on a staff and a keyboard A of a piano. Five spaced parallel elongated rods B are provided having a bass or treble clef symbol carried thereon, indicating the location on the piano keyboard where to play. The spaced parallel elongated rods B and the symbol correspond to a staff of music. The rods are spaced apart a distance corresponding to twice the width of the keys on the keyboard A. Means C is provided for supporting the elongated rods B so that one end of the rods and spaces therebetween, terminate in corresponding keys on the keyboard. A display element is provided having an elliptically shaped main body D and a shank portion E extending therefrom corresponding to the shape of a musical note. The elliptically shaped main body has an elongated slot in a bottom portion thereof so that the display element can be placed on a rod B to represent a line note. The elliptically shaped main body is of a width less than the space between the rods so that the display element can be placed between parallel rods to represent a space note.

The keyboard A illustrated is a conventional keyboard of a piano with the transverse lines 10 representing the spaces between the white keys 11 and the black keys 12 being represented by the solid rectangular shaped members to the rear of the keyboard. Only the center portion of the keyboard and a portion of the side panels 13 of the piano are illustrated. The keyboard is positioned in a conventional housing with a vertical back panel 14 being located adjacent the rear of the black keys 12 and a vertical front panel 15 being located adjacent the front of the white keys. The front panel 15 is spaced forwardly slightly of the white keys so that the keys can be depressed. The front panel 15 is joined by a bottom panel 16 which extends inwardly into the main body of the piano.

A flat elongated means C is provided for supporting the teaching apparatus adjacent the front the piano. The supporting means C consists of an elongated rectangular shaped flat board 17 constructed of any suitable material, such as plywood, and is attached to the front vertical panel 15 by a bracket 18. The bracket 18 has a downwardly turned flange 19 which fits over the top of the vertical front panel 15 for aiding in securing the supporting panel means C to the piano. The other end of the bracket is secured to the bottom side of the flat board 17 by countersunk bolts 20. Positioned outwardly from the bracket 18 is another bracket which is attached to the bottom side of the flat board 17 by a pair of bolts 21. This bracket has a horizontal portion 22 which extends towards the piano and terminates in a downwardly extending tapering portion 23. Positioned on the inner end of the tapering portion 23 is a felt-covered cap 24 which rests against the front panel 15 of the piano for aiding in maintaining the supporting panel C in a horizontal position. Normally, at least two of these sets of brackets are positioned along the bottom side of the supporting panel C. The supporting panel C has a felt covering 25 on the upper surface thereof which is attached thereto by any suitable means, such as by gluing, so as to prevent the display elements from vibrating thereon if the piano is played, or while such are being manipulated.

There are five rods B positioned on the supporting means C perpendicular to the keyboard which are held in a parallel relationship to each other by a stiff wire 26 carried adjacent each end of the rods. This wire 26 extends through each of the rods and is fixed thereto by any suitable means, such as gluing. The rods are spaced relative to each other a distance equal to twice the width of a white key 11. There are five rods B which correspond to the five lines of a musical staff. Positioned on one set of rods is a symbol 27 which represents the treble clef, while positioned on the other set of rods, is a symbol 28 which represents the bass clef. These symbols may be constructed of any suitable material, such as a cloth-covered wire, or may be cut out of plywood or other material. It is noted that the rods B are supported on the supporting means C so that the end of the rods and the spaces therebetween terminate in corresponding keys on the keyboard.

The display elements which consist of a main body D and a shank portion E correspond to musical notes. The main body D of the display element can be constructed of any suitable material, such as molded plastic, and has an elongated slot 29 in a bottom portion thereof, so that the main body can be placed on one of the rods B. The width and depth of the slot 29 is slightly greater than the diameter of the rods B so that such can fit readily thereon. The width of the elliptically shaped main body portion D is slightly less than the space between the rods B so that the display element can be placed between the parallel rods to represent a space note. When the main body is positioned on one of the rods B such represents a line note. A transverse bore 30 extends through the elliptically shaped main body portion D adjacent one end thereof perpendicular to the elongated slot. The bore is of a diameter which is only slightly larger than the diameter of the shank E so that the main body D fits snuggly on the shank E, but by exerting a small force such can be shifted along the shank E. Rather than using a transverse bore 30 a slot could be utilized in the bottom of the main body portion having a width so that there is a pressure fit between the shank E and main body portion D. This enables more than one elliptically shaped main body portion D to be placed on a single shank E so that the interval between the notes can be varied. For example, the same display element can be used to represent the three chords illustrated in FIG. 1, each of which includes two notes. They can also be modified by adding two notes on the shank E to represent the chord illustrated on the treble staff, which includes four notes.

In teaching beginners, the student can clearly see the relationship between the music as represented by the rods and display elements and the keys on the piano. Single notes which only include the main body portion can also be either placed on a rod corresponding to line to represent a line note, or be placed between the rods B to represent a space note. These notes can be shifted along the rod towards the keys on the piano to aid in instilling such in the students mind.

While a preferred embodiment of the invention has been described using specific terms, such description is for illustrative purposes only, and it is to be understood that changes and variations may be made without departing from the spirit or scope of the following claims.

We claim:

1. An apparatus for teaching the relationship between musical notes on a staff and the keyboard of a piano comprising: five spaced parallel elongated rods; a symbol carried on said parallel elongated rods indicating the location on the piano where to play so that said spaced parallel elongated rods and said symbol correspond to the staff; means for spacing said parallel elongated rods a distance corresponding to twice the width of the keys on a keyboard; means for supporting said elongated rods so that one end of said rods and the spaces therebetween terminate in corresponding keys on said keyboard; a display element having an elliptically shaped main body and a shank portion extending therefrom corresponding to the shape of a musical note; said elliptically shaped main body having an elongated slot in a bottom portion thereof so that said display element can be placed on a rod to represent a line note; and said elliptically shaped main body being of a width less than the space between said rods so that said display element can be placed between parallel rods to represent a space note.

2. The apparatus as set forth in claim 1, wherein said means for supporting said elongated rods includes: a platform having an elongated flat surface, and means for attaching said platform on a piano so that said elongated flat surface is level with the keyboard of said piano.

3. The apparatus as set forth in claim 1, wherein said elliptically shaped main body has a transverse bore extending therethrough adjacent one end thereof perpendicular to said elongated slot, and said shank portion being an elongated shaft of such a diameter to fit snuggly within said bore and being long enough to accommodate more than one elliptically shaped main body.

4. An apparatus for teaching the relationship between musical notes on a staff and a keyboard corresponding to that of a piano comprising: a keyboard having a plurality of keys thereon corresponding to the keys on a piano; five spaced parallel elongated rods; a symbol carried on said parallel elongated rods indicating the location on the piano where to play so that said spaced parallel elongated rods and said symbol correspond to the staff; means for spacing said parallel elongated rods a distance corresponding to twice the width of the keys on said keyboard; means for supporting said elongated rods so that one end of said rods and spaces therebetween terminate in corresponding keys on said keyboard; a display element having main body and a shank portion extending therefrom corresponding to a musical note; said main body having an elongated slot in a bottom portion thereof so that said display element can be placed on a rod to represent a line note; said main body being of a width less than the space between said rods so that said display element can be placed between parallel rods to represent a space note; a transverse bore extending through said main body adjacent one end thereof perpendicular to said elongated slot, and said shank portion being an elongated shaft of such a diameter to fit snuggly within said bore and being of a length great enough to span said five spaced parallel rods; whereby more than one main body can be placed on said shank portion and the interval therebetween can be varied.